United States Patent
Okada

(10) Patent No.: US 7,386,228 B2
(45) Date of Patent: Jun. 10, 2008

(54) IMAGE TAKING APPARATUS AND IMAGE TAKING METHOD

(75) Inventor: Kouji Okada, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 228 days.

(21) Appl. No.: 11/298,846

(22) Filed: Dec. 9, 2005

(65) Prior Publication Data

US 2006/0127084 A1 Jun. 15, 2006

(30) Foreign Application Priority Data

Dec. 15, 2004 (JP) ............................. 2004-363411

(51) Int. Cl.
G03B 7/00 (2006.01)
G03B 7/12 (2006.01)
G03B 15/03 (2006.01)
H04N 5/232 (2006.01)
H04N 5/235 (2006.01)

(52) U.S. Cl. ...................... 396/238; 396/215; 396/161; 348/221.1; 348/362

(58) Field of Classification Search ................ 396/439, 396/63, 65, 155, 161, 166, 167, 179, 180, 396/211–213, 215, 237, 238; 348/220.1, 348/221.1, 362

See application file for complete search history.

(56) References Cited

U.S. PATENT DOCUMENTS

2003/0202115 A1* 10/2003 Sugimoto et al. ........... 348/362

\* cited by examiner

Primary Examiner—Rochelle-Ann Blackman
(74) Attorney, Agent, or Firm—Cowan, Liebowitz & Latman, P.C.

(57) ABSTRACT

An image taking apparatus installed with an image blur correction unit for correcting image blur by combining images, so image taking time in a case of continuous shooting of the images is prevented from being long and operations are carried out in a manner in which a photographer does not feel disorder. Combination of a second frame and a third frame that are taken with split-exposure is started from a frame that is prior by two frames in terms of time. Thereby the number of times of split-exposure operations necessary to obtain three combined images is eight, so the image taking time is made to be shorter compared to a case of simple continuous combination of the images. Further, the three combined images produced in this way include a portion overlapped in terms of time, however, the combined images are images different from one another that are continuous in terms of time, so the photographer does not feel disorder as long as setting is made as to how many frames are shifted for combination.

3 Claims, 9 Drawing Sheets

IMAGE TAKING APPARATUS AND IMAGE TAKING METHOD

BACKGROUND OF THE INVENTION

1. Field of the Invention

The present invention relates to an image taking apparatus and an image taking method for improving an image quality of a taken image by correcting image blur caused by hand shake.

2. Related Background Art

In a recent camera, most of operations important for taking an image such as determination of exposure, and focusing are automated, so even an unskilled operator is not likely to fail in image taking.

Further, in resent times, a system for suppressing hand shake applied to the camera (vibration-proofing system=image stabilizer) has been studied. Therefore, there is almost no cause for failure in image taking.

For the image stabilizer, a system called an optical image stabilizer that detects vibration of the camera due to hand shake and displaces a correction lens in a plane orthogonal to an optical axis in accordance with a result of the determination is widely used.

In order to implement a high performance image stabilizer, it is important, firstly, to precisely detect the vibration of the camera, and secondly, to correct variance in the optical axis caused due to hand shake.

Then, high quality image blurring correction is carried out by driving shake correcting optical means that decenters an image taking optical axis on the basis of an output of a vibration detection section.

The camera shake at the time of taking an image is, in an ordinary case, a vibration of a frequency of 1 to 10 Hz.

Meanwhile, Japanese Patent Application Laid-open No. H05-7336 discloses a method in which an exposure time required for image taking is divided into multiple time periods, a plurality of times of image taking is repeated in a short exposure time to the extent that no hand shake occurs, positional deviations between a plurality of the obtained images are corrected, and thus a combined taken image of a part in which the position of the images are matched is obtained.

In recent times, a digital camera has been more and more miniaturized. The size of the digital camera is made small so as to be embedded in portable electronic apparatuses such as a cellular phone.

In installing a camera that has the optical image stabilizer mentioned above to a small apparatus like this, it is necessary to further downsize the shake correcting optical means, or otherwise, to downsize the vibration detection section.

However, there is a limit for the miniaturization because in the shake correcting optical means, it is necessary to support a correction lens and to drive the correction lens with high accuracy.

In addition, most of the vibration detection sections as presently used utilize inertial force, and therefore there arises a problem in that sensitivity of detection is deteriorated when the vibration detection section is downsized.

Further, as the vibration or shake applied to the camera, there is an angular vibration that is the vibration around a given axis and shift vibration that shakes the camera in parallel directions.

The angular vibration can be corrected by the optical image stabilizer, however, it is difficult to countermeasure the shift vibration.

In particular, as the camera becomes smaller in sizes, the shift vibration tends to be much greater.

On the other hand, as employed in a video camera, there is a method in which a motion vector of the screen is determined by the image taking element, a range of reading the image is varied in accordance with the motion vector, and thereby a motion picture without blur is obtained.

In the case of this method, a dedicated vibration detection section such as the optical image stabilizer as described above and the correction lens are not necessary, and therefore there is such a merit that it is possible to downsize the whole product.

However, it is difficult to apply the image stabilizer of the video camera to the digital camera.

This is because, in the video camera, the motion vector is extracted for each reading of the image and in a case where fifteen frames are extracted per one second, for example, it is necessary to determine the motion vector by comparing the extracted images to one another.

In a case where a still image is taken by the digital camera, only one exposure is carried out in relation to a photographing subject. Accordingly, it is not possible to determine the motion vector by comparing the images as in the case of the video camera.

Therefore, it is difficult to simply adapt the vibration system of the video camera to the digital camera.

On the other hand, in the image stabilization method as disclosed in Japanese Patent Application Laid-open No. H05-7336, the images taken a plurality of times are combined to obtain one image in which image blurring is corrected, and accordingly, the time taken for image taking is long.

In addition, in the present times, most of the cameras are provided with a rapid shooting function for continuously taking a plurality of still images with one single operation of a release switch.

In this regard, if the image stabilization method as disclosed in Japanese Patent Application Laid-open No. H05-7336 is used in combination with the rapid shooting function, there arises a further serious problem in that the time taken for image taking becomes long.

SUMMARY OF THE INVENTION

An object of the present invention is to solve the above-mentioned problems that occur when a continuous or rapid shooting function is used.

In order to achieve this, image taking is repeated a plurality of times with an exposure time in which no hand shake is likely to occur, and images obtained by the plurality of times of image picking up are corrected in terms of positional deviation while being subjected to combination.

With the above configuration, it is possible to prevent a problem in that time taken for image taking or image picking up at the time of continuous or rapidly shooting becomes long from arising, and it is also possible to provide an image taking apparatus and an image taking method in which a photographer does not feel disorder.

According to the image taking apparatus and the image taking method according to the present invention, it is possible to obtain consecutive still or still images without making the time for image taking long, and carry out correction of blurring of the images. Further, according to the present invention, the image taking apparatus can be downsized to a size small enough to allow the operability to be favorable to the photographer.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
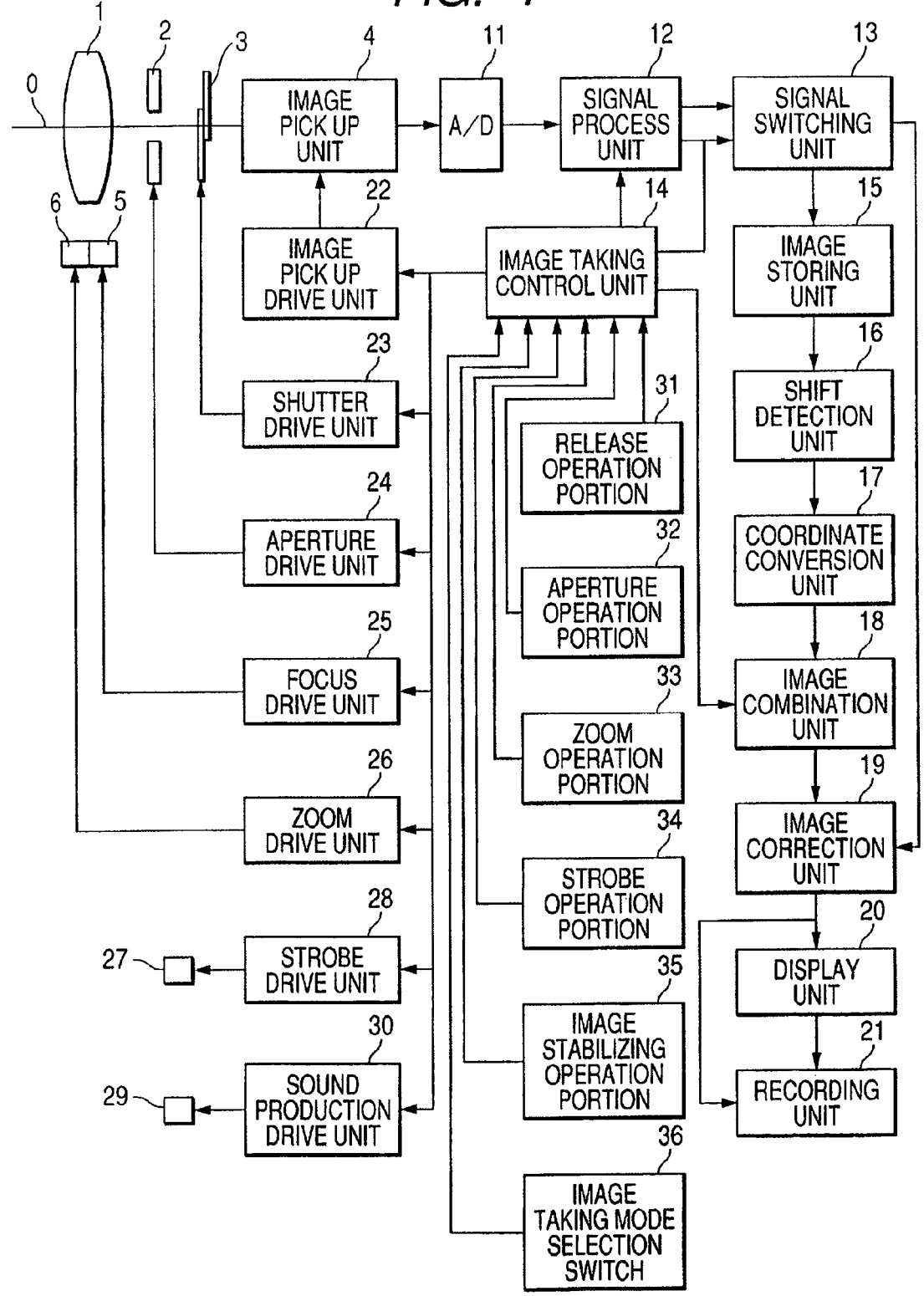
FIG. 1 is a structural view of a block circuit of a camera.

The present invention is explained in detail below on the basis of an embodiment as shown in the drawings.

FIG. 1 is a structural view of a block circuit of a camera of this embodiment.

In FIG. 1, at the back of an image taking lens 1 that is disposed on an optical axis O, an aperture 2, a shutter 3, and an image taking unit 4 configured by a semiconductor image taking element such as a MOS and CCD are arranged in the stated order.

The image taking lens 1 can be moved by an AF (automatic focus) drive motor 5 and a zoom drive motor 6 in a direction of the optical axis O.

An output of the image taking (pick-up) unit 4 is subjected to an A/D conversion by an A/D conversion unit 11, and then the output of the image taking unit 4 is connected to a signal process unit 12.

An output of the signal process unit 12 is connected to a signal switching unit 13 and an image taking control unit 14.

An output of the signal switching unit 13 is serially connected to an image storing unit 15, a shift detection unit 16, a coordinate conversion unit 17, an image combination unit 18, an image correction unit 19, and a display unit 20 configured by a liquid crystal provided at the back of the camera, and to a recording unit 21 such as a semiconductor memory attachable and detachable in relation to the camera.

In addition, the output of the signal switching unit 13 is directly connected to the image correction unit 19 also.

An output of the image correction unit 19 is also connected to the recording unit 21.

An output of the image taking control unit 14 is connected to an image pick-up drive unit 22 that drives the signal switching unit 13, the image combination unit 18, and the image taking unit 4.

Further, an output of the image taking control unit 14 is connected to a shutter drive unit 23 that drives the shutter 3, an aperture drive unit 24 that drives the aperture 2, a focus drive unit 25 that drives the AF drive motor 5, a zoom drive unit 26 that drives the zoom drive motor 6, a strobe drive unit 28 that drives a strobe 27, a sound production drive unit 30 that drives a speaker 29, and the like.

Furthermore, an output of each of a release operation portion 31, an aperture operation portion 32, a zoom operation portion 33, a strobe operation portion 34, an image stabilizer operating portion 35, and an image taking mode selection switch 36 are connected to the image taking control unit 14.

In addition, although omitted in FIG. 1, a function for optically correcting image blur may be added to the camera, in addition to the function for correcting the image blur by combining the images.

The image taking lens 1 is configured by a plurality of optical lens groups.

A part of or all of the optical lens groups are moved on the optical axis O upon reception of a driving force from the AF drive motor 5, and stops at a given focusing position to adjust the focus.

The AF drive motor 5 is driven by receiving a drive signal from the focus drive unit 25 driven by the image taking control unit 14.

Further, the optical lens group of one part of the image taking lens 1 is driven by the zoom drive motor 6 so as to move on the optical axis O, and stops at a given zooming position to change a photographing field angle.

The zoom drive motor 6 is driven by receiving the driving signal from the zoom drive unit 26.

The aperture 2 is provided with a plurality of aperture blades. The aperture blades of the aperture 2 is operated by the driving force from the aperture drive unit 24, and thus an aperture diameter of an aperture area to be a light passing port is changed.

The shutter 3 is provided with a plurality of shutter blades. The shutter 3 is driven by the shutter drive unit 23 and an opening part thereof that is a light passing port is opened and closed.

With the configuration like this, photographic light incident from the image taking lens 1 is restricted of a light amount thereof by the aperture 2, and then passes through the shutter 3 and is made incident into the image taking unit 4.

Further, in accordance with conditions such as luminance of a subject at the time of image taking, the strobe 27 emits light while receiving the driving signal from the strobe drive unit 28.

Furthermore, in order to notify a photographer of an image taking operation, the speaker 29 produces a sound upon reception of a driving signal from the sound production drive unit 30.

The image taking control unit 14 outputs a control signal to the focus drive unit 25, the zoom drive unit 26, the aperture drive unit 24, the shutter drive unit 23, and the strobe drive unit 28 in accordance with a state of image taking of the camera and carries out image taking.

Note that an aperture diameter of the aperture 2 and the emission of light of the strobe 27 are automatically set by the camera at the time of image taking, in an ordinary case. Therefore, the aperture operation portion 32 and the strobe operation portion 34 are not necessary in the ordinary case, however, the aperture operation portion 32 and the strobe operation portion 34 are provided for a case where the photographer arbitrarily sets the image taking conditions.

A video signal outputted from the image taking unit 4 is converted into a digital signal by the A/D conversion unit 11, and is inputted to the signal process unit 12.

The signal process unit 12 carries out a signal processing such as generating a luminance signal and a color signal in relation to the inputted signal, and forms a color video signal.

The video signal that is subjected to the signal processing by the signal process unit 12 is inputted to the image correction unit 19 via the signal switching unit 13.

In the image correction unit 19, gamma correction and compression processing of the inputted signal are carried out. The signal from the image correction unit 19 is inputted to the display unit 20 and the recording unit 21. Then, the taken image is displayed on the display unit 20 and is recorded into the recording unit 21.

In the above operations, if the subject to be taken is dark and accordingly exposure time seconds are long, hand shake is liable to occur. Therefore, the photographer operates the image stabilizer operating portion 35 to cause the image stabilizer to be ON and switches to image stabilizing operation.

The switching between ON/OFF states of the image stabilizer may be performed by the photographer by operating the image stabilizer operating portion 35, or otherwise, may be automatically set by the camera.

In a state where the image stabilizer is ON, it is possible to switch between two modes by the image taking mode selection switch 36.

The two modes are, namely, a single shooting mode in which image taking is carried out a plurality of times by one operation of a release switch and combines the taken images to finally obtain one image, and a continuous shooting mode in which a plurality of images that are corrected with respect to image blur are finally obtained by one operation of the release switch.

Note that the continuous shooting mode as described here does not mean split exposure intended for image stabilization, which is to be described later. The continuous shooting mode refers to an image taking mode that has conventionally been provided to many types of cameras and is intended to finally obtain a plurality of images.

In a case where the photographer selects the single shooting mode by means of the image taking mode selection switch 36, if the photographer half-presses a release button (SW1) of the release operation portion 31, image taking preparation operation such as focus adjusting operation and photometry operation is started.

On the basis of a photometric value obtained by the photometry operation, the exposure time by the shutter 3 and the aperture diameter of the aperture 2 are set.

In general, under image taking conditions for the case where the image stabilizer is used, in most cases, the subject is dark, the aperture is set to be fully open, and the exposure time is an exposure time for long time seconds.

In this regard, the exposure time is divided into a plurality of short period of exposure times, and the image taking is repeated in a number of times equivalent to the number of divided exposure times.

Thus, when the exposure time is divided into short exposure times, each of the images obtained by the exposure is underexposed, however, each of the images is not so much affected by the hand shake due to the short exposure time thereof.

In addition, it is possible to improve the exposure by combining the plurality of images into one combined image after image taking is ended.

Even though each of the images obtained by a plurality of times of image taking is not subjected to effect from the hand shake, in some cases, composition between each of the images is slightly misaligned or deviated due to the hand shake occurring during continuous shooting.

Here, if the images are combined as they are, the combined image is blurred in a level equivalent to the deviation or misalignment of the composition of each of the images.

In this embodiment, an image signal that is outputted from the image taking unit 4 in plurality for each of the exposure in accordance with the split exposure is converted into the digital signal by the A/D conversion unit 11, and then is subjected to the signal processing in the signal process unit 12.

When the image stabilizer is set to be ON by operating the image stabilizer operating portion 35, a plurality of image data that is outputted from the signal process unit 12 is inputted to the image storing unit 15 via the signal switching unit 13. At this time, the input to the image correction unit 19 is suspended.

The shift detection unit 16 extracts characteristic points within the image stored in the image storing unit 15, and calculates positional coordinates of the characteristic points within image taking screen.

Figure 2:
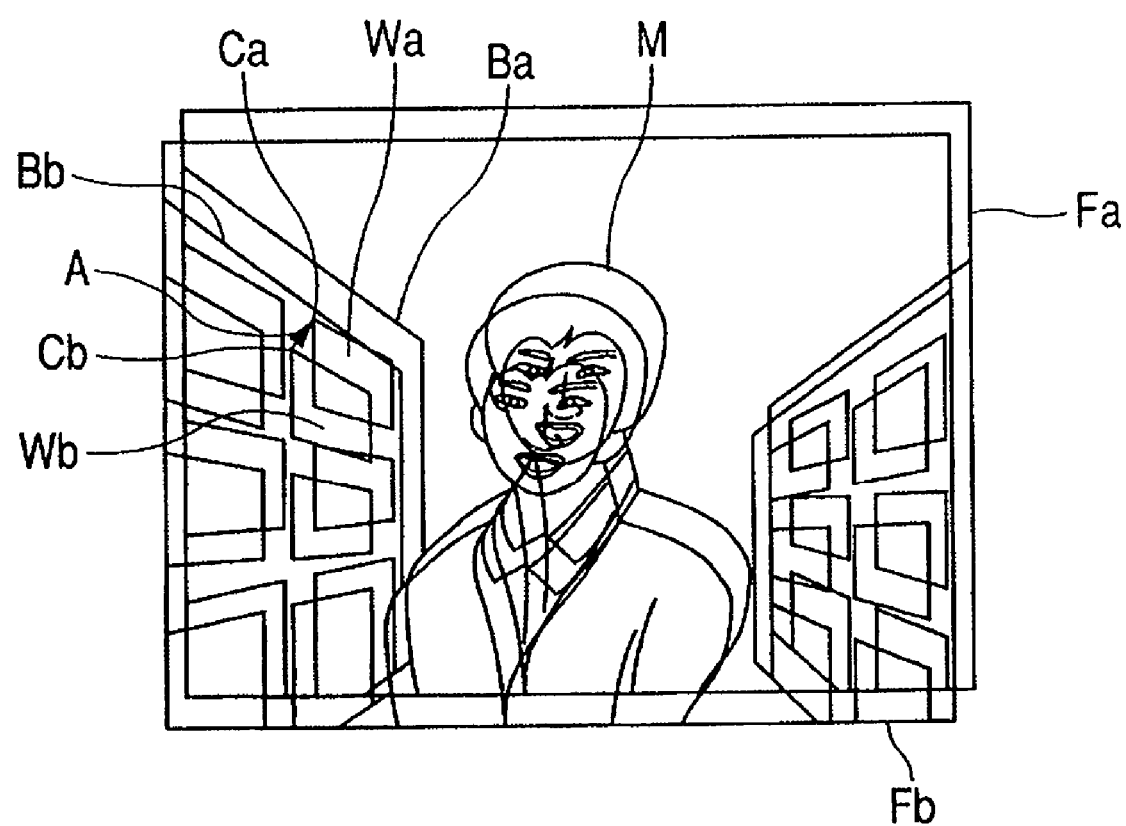
FIG. 2 is an explanatory view for explaining coordinate conversion.

For example, examination is made as to a case where a photograph is taken in which a person M stands in front of a building Ba, in a frame Fa, as shown in FIG. 2.

In this case, when a plurality of images is taken, there is a case where an image whose composition is deviated from the frame Fa due to the hand shake is taken, as shown in a frame Fb.

The shift detection unit 16 extracts, of the building Ba that is located in the peripheral portion of the screen, an edge of a window Wa whose luminance is high, as a characteristic point Ca by edge detection.

The shift detection unit 16 compares the extracted characteristic point Ca with the characteristic point Cb extracted with respect to the edge of the window Wb of the frame Fb, and then carries out correction by coordinate conversion of the difference between the characteristic point Ca and the characteristic point Cb by the coordinate conversion unit 17.

Here, the characteristic point is selectively extracted from the peripheral portion of the image taking screen because of the reasons as described below.

That is, in most cases of image taking, the main subject is positioned in the vicinity of a central portion of the screen and also the main subject is a person.

In this case, if the main subject is selected as the characteristic point, there arises a failure in image taking due to shake of the subject.

That is, when a plurality of images is taken, the image taking is subjected not only to the hand shake of the photographer but also to the shake of the subject. Accordingly, coordinate conversion of the image is carried out on the basis of the shake of the subject.

In this case, it is considered that a preferable image can be obtained because the coordinate conversion is carried out so that the composition of the main subject is proper. However, in general, a person moves in a complex manner, and accordingly, accuracy in detection of the deviation is significantly affected by a portion in which the characteristic point is selected.

For example, in a case where eyes of the subject that is a person are selected as the characteristic points, the detection of deviation is affected by blinking of the eyes, while in a case where the ends of the fingers of the person is selected as the characteristic points, the hands and the fingers move frequently, and accordingly, the shake of the hands and the fingers is different from the actual shake of the whole portion of the subject.

Thus, if the coordinate conversion of the image is carried out with one point of the person as the characteristic point, the whole portion of the person cannot necessarily be subjected to a proper coordinate conversion.

Also in a case where a plurality of images is subjected to coordinate conversion to be combined together, positions of the coordinates are different from one another for each of the images, resulting in failure in obtaining a preferable image.

In this regard, a preferable image can be obtained by selecting a static subject such as the building at the back of the person according to this embodiment as the characteristic point and carry out coordinate conversion of the images.

The images that are subjected to coordinate conversion are combined by the image combination unit 18, then the combined image is subjected to gamma correction and compression processing of the inputted signal by the image correction unit 19, and the resultant image is displayed on the display unit 20 and is recorded into the recording unit 21.

In carrying out combining processing of the images, as shown in FIG. 2, the characteristic point Cb in the frame Fb is overlapped to the characteristic point Ca of the frame Fa in a manner as indicated by an arrow A, and the frame Fb is subjected to coordinate conversion.

Figure 3A:
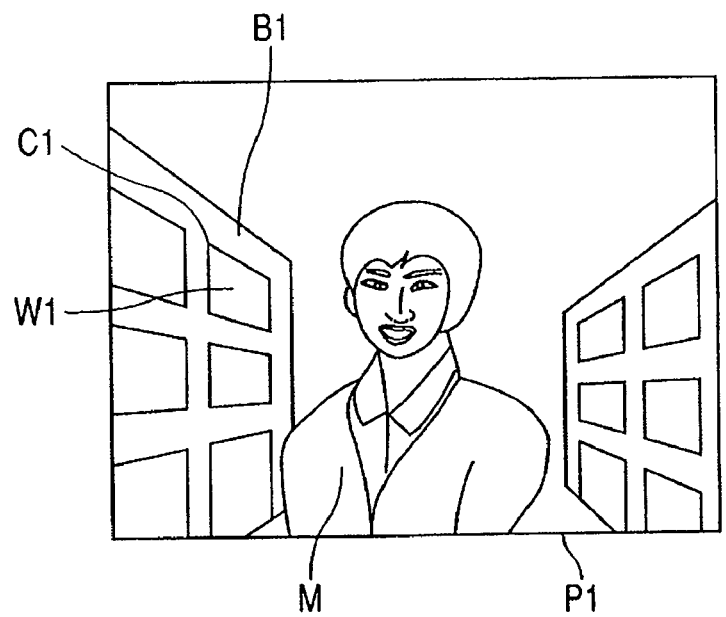
FIGS. 3A and 3B are explanatory views for explaining extraction of characteristic points.
Figure 3B:
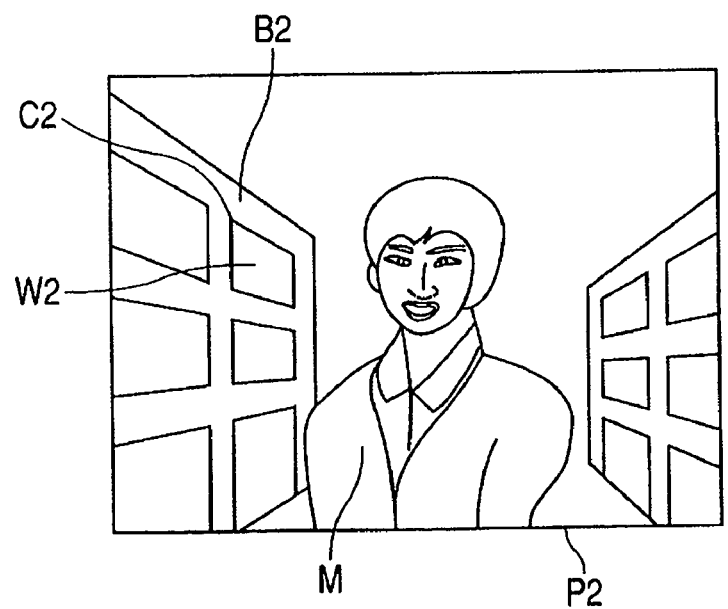

FIGS. 3A and 3B are explanatory views of this processing. In buildings B1 and B2 in the peripheral portion of the screen of a first image P1 as shown in FIG. 3A and a second image P2 as shown in FIG. 3B, respectively, edges of windows W1 and W2 which are of high luminance, are extracted as characteristic points C1 and C2 by edge detection.

As explained with reference to FIG. 2, the characteristic point C1 in the first image P1 and the characteristic point C2 in the second image P2 are compared to each other, and the difference between them is subjected to coordinate conversion and correction.

In other words, the coordinate conversion unit 17 carries out coordinate conversion of the second image P2 by overlapping the characteristic point C2 of the second image P2 to the characteristic point C1 of the first image P1.

Then, with regard to the images from the second image frame onwards among a second group of images, coordinates of the characteristic point C of each of the images are determined, and the coordinate conversion unit 17 carries out coordinate conversion of the second group of images by overlapping the coordinates of the characteristic point C to the coordinates of the characteristic point C1 that is defined with respect to the first image P1.

Here, the coordinates of the characteristic point of each of the images are calculated for purposes of explanation. However, in actuality, relationship between the first image P1 and the second image P2, which is a first image frame of the second group of images, is calculated, then variance in pixels corresponding to each of the image P1 and the image P2 is calculated by the shift detection unit 16 as a motion vector which is the variance in the characteristic point C.

Then, with regard to a second image frame of the second group of images, the variance in the characteristic point C is calculated by relational calculation with the first image P1, and thereafter in a similar way, the variance of the characteristic point of each of the images is calculated.

Note that the characteristic point C may be selected at each of a plurality of positions instead of at one position. That is, in this case, an average value of motion vector of plural points or a minimum value of a scalar thereof is used as the variance of the characteristic point.

Here, the minimum value is used as the variance in the characteristic point in order to select the characteristic point that makes a least movement among possible characteristic points because there is a possibility that the characteristic point itself selected in the peripheral portion of the screen moves.

In the case of a digital image, it is possible to correct the exposure by increasing the gain even in a case of one underexposed photograph, however, if the gain is increased, there arise more noises, resulting in obtaining less clear image which is not beautiful.

However, by combining a great number of images as explained in this embodiment, in increasing the gain of the whole portion of the images, it is possible to obtain an image of a high S/N ratio because the noise of each image is averaged. As a result, the noise is suppressed and the exposure can be made proper.

From a different point of view, this can be said that a plurality of images are taken with the noises being allowed to occur and the image taking unit 4 being highly sensitive to reduce random noises included in the images by averaging the noises of the images, for example.

Figure 4:
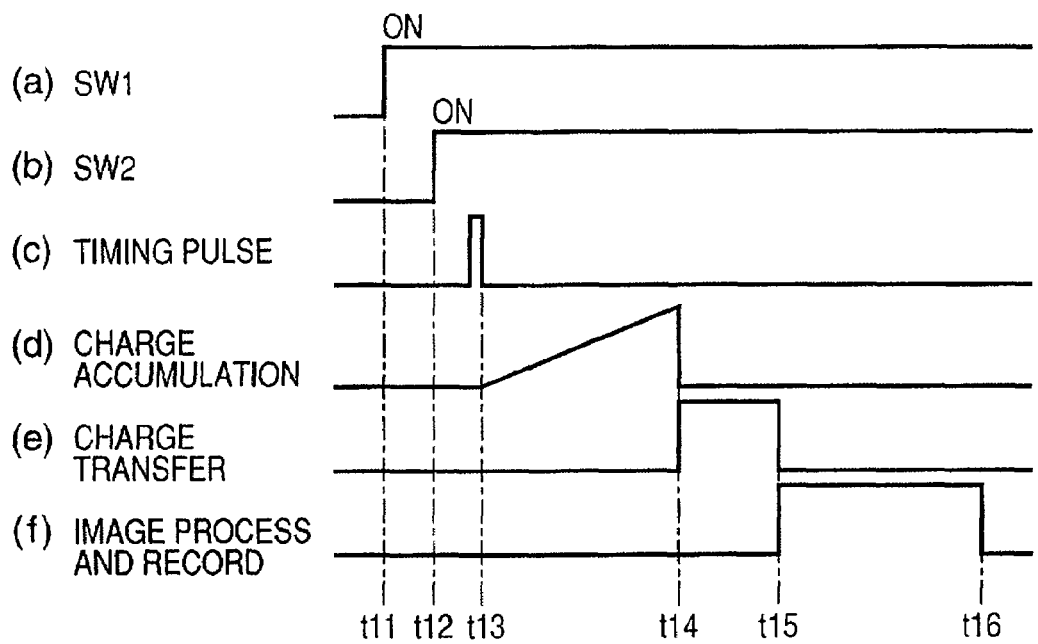
FIG. 4 is a timing chart showing a state where image stabilization is OFF in a single shooting mode.

FIG. 4 is a timing chart at the time of single shooting mode in which image stabilization is not carried out.

First, as shown in a part (a) of FIG. 4, when the release button of the release operation portion 31 is half-pressed (SW1) at a time t11, the camera carries out various kinds of image taking preparation operations such as the photometry and focus adjustment.

Then, as shown in a part (b) of FIG. 4, when the release operation portion 31 is fully pressed (SW2) at a time t12, the processing advances image taking driving, and then, as shown in a part (c) of FIG. 4, a charge accumulation startup timing pulse is inputted at a time t13.

Then, as shown in a part (d) of FIG. 4, charge is accumulated in the image taking unit 4, the accumulation of charge is completed at a time t14, and immediately after that, transfer of the accumulated charge is started as shown in a part (e) of FIG. 4.

When the transfer of the charge is completed at a time t15, image processing and the recording operation are carried out by the image correction unit 19 and the recording unit 21, as shown in a part (f) of FIG. 4.

Figure 5:
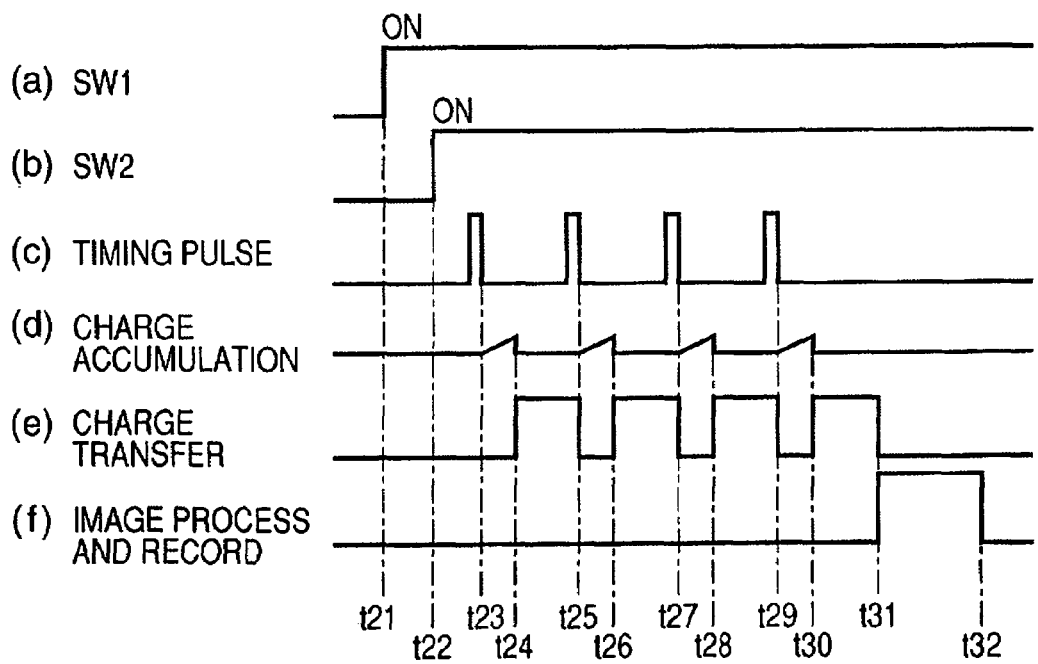
FIG. 5 is a timing chart showing a state where image stabilization is ON in a single shooting mode.

FIG. 5 is a timing chart showing a case where under image taking conditions in the single shooting mode, the image stabilizer is ON, the number of times of division of the exposure time is set to be four times, and the divided images are combined to obtain one image.

As shown in a part (a) of FIG. 5, when the release operation portion 31 is half-pressed (SW1) at a time t21, the camera carries out various kinds of image taking preparation operations such as the photometry and focus adjustment.

Then, as shown in a part (b) of FIG. 5, when the release operation portion 31 is fully pressed (SW2) at a time t22, the processing advances to image taking driving, and then, as shown in a part (c) of FIG. 5, a charge accumulation startup timing pulse is inputted at a time t23.

Then, as shown in a part (d) of FIG. 5, charge is accumulated in the image taking unit 4, the accumulation of charge is completed at a time t24, and immediately after that, transfer of the accumulated charge is started as shown in a part (e) of FIG. 5.

After repeating the accumulation of the charge and the transfer of the accumulated charge four times, the image processing and recording are started at a time t31 as shown in a part (f) of FIG. 5, and the processing ends at a time 32.

Suppose that the time period from the start of the accumulation of the charge to the completion of the transfer of the accumulated charge being the image taking time when the case where the image stabilization is ON and the case where the image stabilization is OFF are compared, the image taking time (t15-t13) is 1/10 second, with the exposure time in the case where the image stabilization is OFF (t14-t13) being 1/15 second and the transfer time being 1/30 second, for example.

On the other hand, the exposure time per one image in the case where the image stabilization is ON (t24-t23, t26-t25, t28-t27, and t30-t29) is 1/60 second, and accordingly, the exposure time for taking four images in this case is 1/15 second. In addition to this, considering the time taken for the charge transfer, the image taking time (t31-t23) is 1/5 second, which is twice the case where the image stabilization is OFF.

Next, in the case where the continuous shooting mode is selected, the setting is set to be either of a first continuous (rapid) shooting mode in which the use of the image stabilizer is prohibited in the image taking control unit 14 or a second continuous shooting mode in which the image stabilizer is turned ON.

The continuous shooting mode as described here refers to an image taking (image pick-up) mode by which the photographer intends to finally obtain a plurality of images.

The continuous shooting mode as referred to here differs from the split exposure in the case of the single shooting mode by which the photographer intends to finally obtain one image.

If the first continuous shooting mode is set, an operation for carrying out a plurality of times of image taking just as in the case where the image stabilizer as described above is OFF, in other words, the operation just as in the case of a continuous shooting mode of an ordinary camera, is repeated, while the release operation portion 31 is fully pressed.

If the second continuous shooting mode is set, the exposure time for proper exposure is divided into plural short exposure times, as described above and the split exposure is repeated while the release operation portion 31 is fully pressed (SW2).

Then, all the images are stored in the image storing unit 15, and image blur correction is carried out with respect to all the images.

The shift detection unit 16 extracts the characteristic point within the images stored in the image storing unit 15 and calculates positional coordinates within the image taking screen of the characteristic point.

The images that are subjected to coordinate conversion by the coordinate conversion unit 17 are combined by the image combination unit 18. When the signal indicating that the mode is set to be the second continuous shooting mode is sent to the image combination unit 18 from the image taking control unit 14, the plural images that are combined by shifting by given frames in terms of time are serially sent to the image correction unit 19.

Here, two combined images of the plural combined images sent to the image correction unit 19 that are continuous in terms of time are configured by a group of split-exposed images including n common split-exposed images (n is an integer equal to or greater than 1).

The image taking time becomes longer in proportion to the number of the split exposure of the images, and accordingly, the photographer feels disorder if the number of the split exposure is too large.

The number of images obtained by the split exposure does not increase in the second continuous shooting mode, however, the number of taken images that are necessarily to be subjected to image blur correction increases. Accordingly, the image taking time becomes much longer, and as a result, in this case, the system is not convenient for use.

Figure 6:
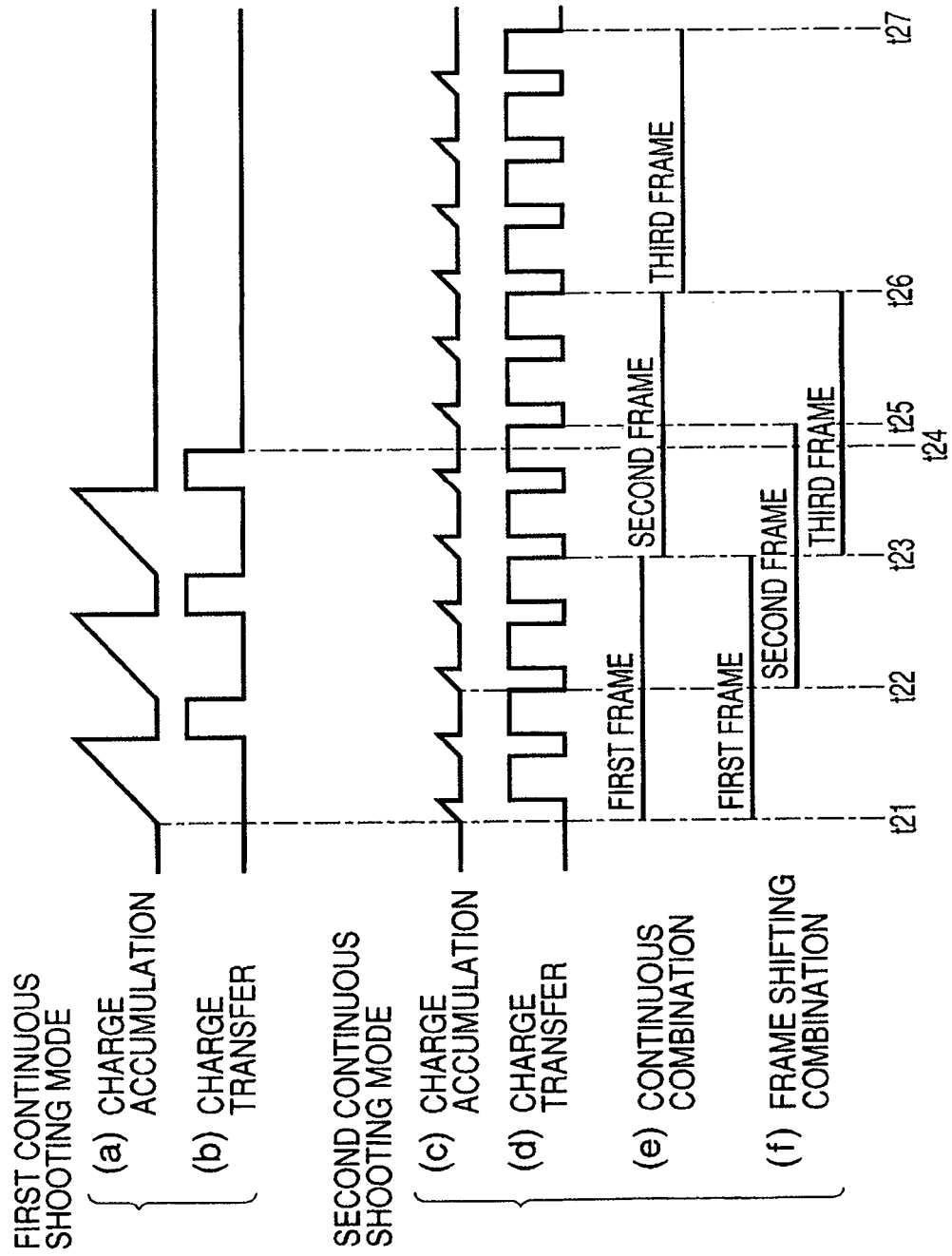
FIG. 6 is a timing chart at the time of continuous shooting mode.

In this regard, in the second continuous shooting mode, a frame shifting combination method as shown in FIG. 6 is used.

FIG. 6 is a timing chart of continuous shooting in the case where the image stabilization is OFF.

That is, parts (a) and (b) of FIG. 6 show timing charts of the first continuous shooting mode, and parts (c) through (f) of FIG. 6 show timing charts in the case of continuous shooting in the case where the image stabilization is ON, namely, the timing charts for a time period from the start of accumulation of the charge to the completion of the transfer of the charge in the second continuous shooting mode.

Here, the case where the number of images that are continuously shot is three both in the first continuous shooting mode and the second continuous shooting mode is expected, that is, the case where the photographer finally obtains three images is expected.

Here, the number of split-exposed images in the case where the image stabilization is ON is four. In this case, if the images are simply combined continuously in terms of time in order to obtain three combined images with the image stabilization being ON, as shown in a part (e) of FIG. 6, the number of necessary split exposure times is 4×3=12, resulting in nearly twice the image taking time in the first continuous shooting mode.

The image taking time is, as described above, predominantly affected by the time for transfer of the charge and the number of split-exposed images, and accordingly, the image taking time is liable to be much longer, depending on image taking conditions such as focal length and brightness, and the characteristics of the camera such as number of pixels and rate of transfer of the charge.

In this regard, as shown in a part (f) of FIG. 6, combination of the second and third frames is started from the frame that is prior by two frames in terms of time (here, n=2).

In this way, the number of times of split exposure necessary for obtaining three combined images is eight, and thus the image taking time is made shorter compared to the case as shown in the part (e) of FIG. 6 in which the images are simply and consecutively combined.

In addition, in the three combined images that are produced in the case of the method as explained in the part (f) of FIG. 6, there is a period of time overlapping in terms of time, however, the photographer has no sense of incongruity if how many frames are mutually shifted for combination is properly set, because images different from one another and continuous in terms of time are obtained.

Note that in the parts (a) through (f) of FIG. 6, the frames are shifted by two frames, however, the number of the frames to be shifted (n) may be set at a previously determined given number, or otherwise, the camera may automatically set the number of frames to be shifted depending on the number of split-exposed images and the like. In addition, the photographer may freely determine the number of the frames to be shifted.

Figure 7:
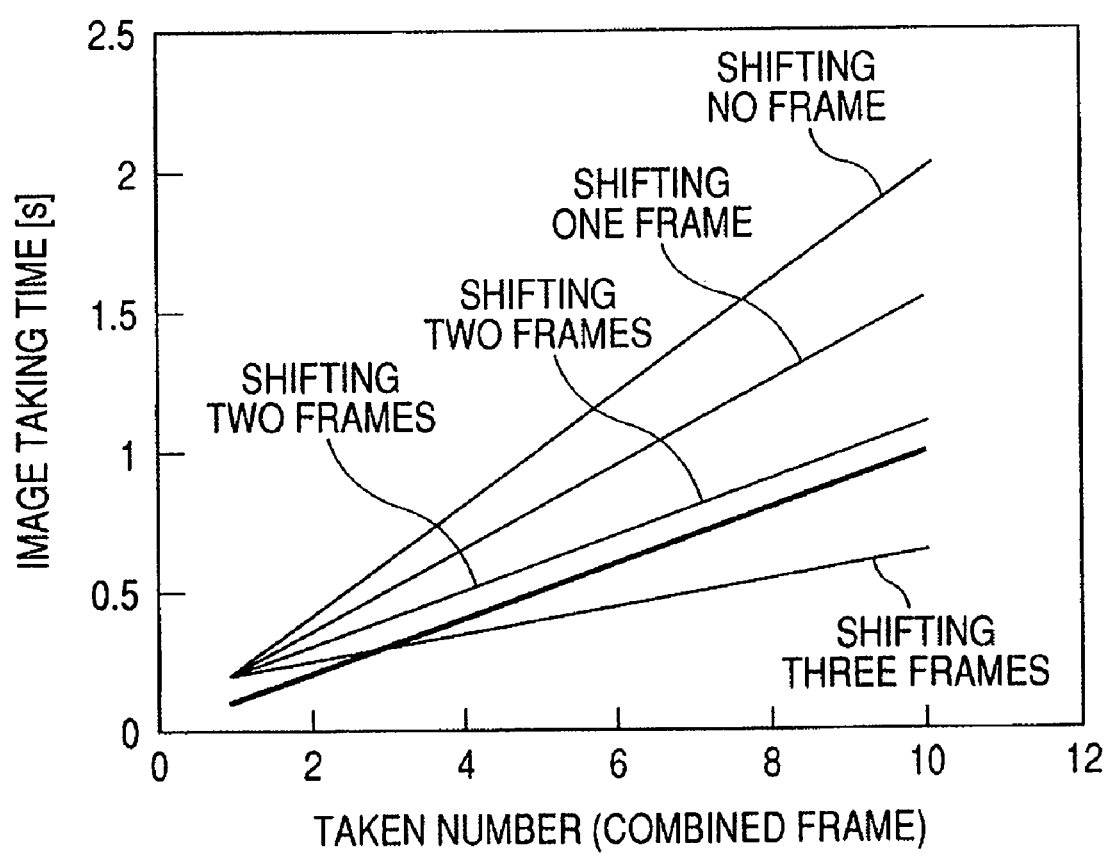
FIG. 7 is a graph showing a relationship between a image taking time and a taken number at the time of continuous shooting mode.

FIG. 7 shows a relationship between the image taking time and the number of combined taken images when the number of frames to be shifted at the time of combination is varied.

A bold line shown in FIG. 7 indicates a time relation in the case of the first continuous shooting mode when the image stabilization is OFF.

In FIG. 6, the frames are shifted by two frames for combination, and this shifting is substantially equivalent to the shifting by two frames as shown in FIG. 7. In the case of shifting three frames, the image taking is completed earlier than the case where the image stabilization is OFF, however, if too many frames are shifted, one same split-exposed image is used for combination again and again. Therefore, in this regard, it is necessary to be aware of this because in this case, the resulting final combined images are liable to have no difference.

Figure 8:
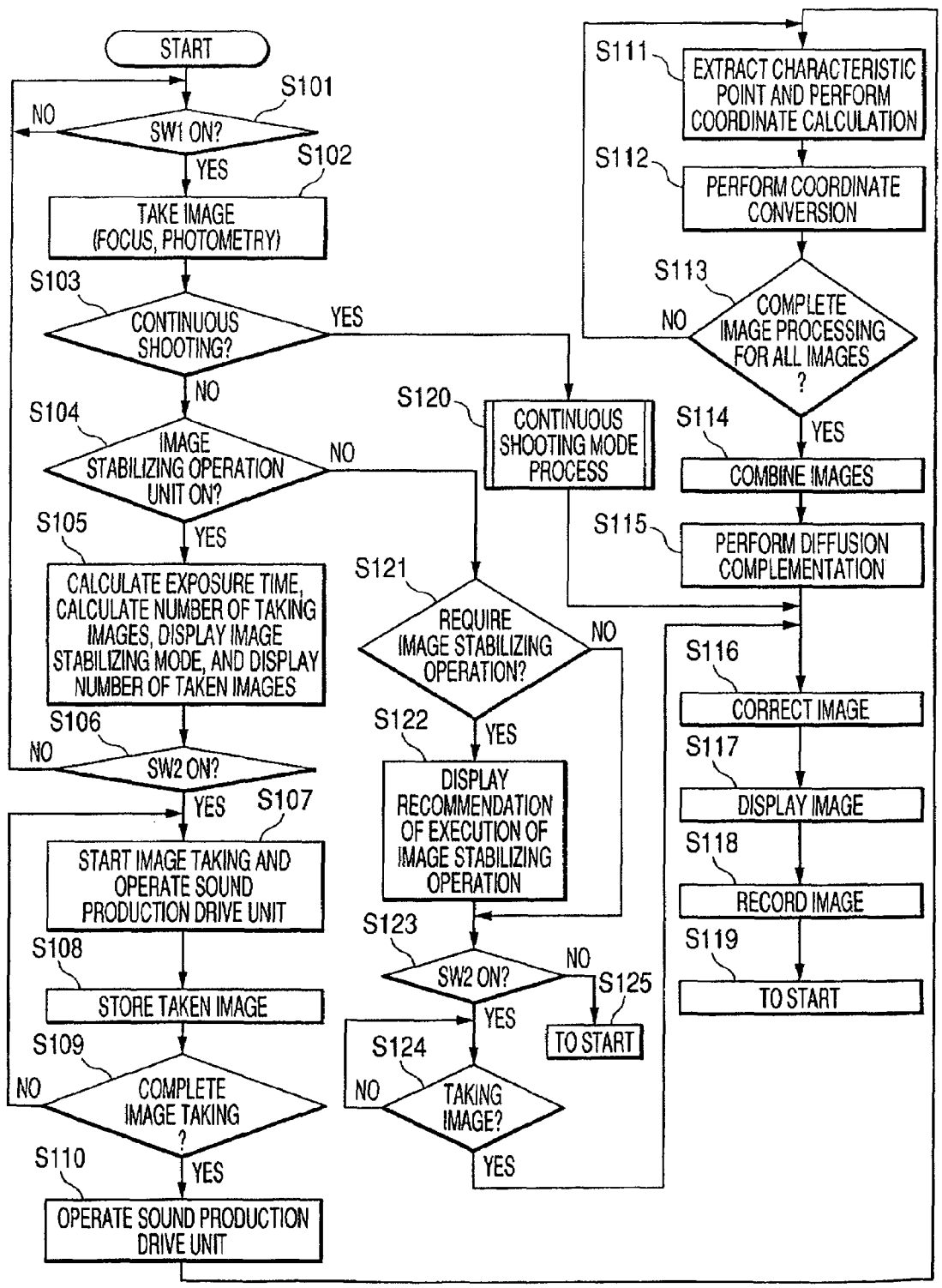
FIG. 8 is a flow chart of an image taking processing operation.

FIG. 8 is a flow chart of the image taking operation of the camera including the operation in the case of both of the single shooting mode and the continuous shooting mode. The process starts when the camera is turned ON. In Step S101, the processing remains in a standby state until the photographer half-presses the release operation portion 31 (SW1). When the photographer half-presses (SW1), the processing proceeds to Step S102.

In Step S102, image taking is carried out by the image taking unit 4.

The image taking control unit 14 detects a contrast of the images on the basis of the output from the signal process unit 12, while driving the AF drive motor 5 and moving the image taking lens 1 in the direction of the optical axis.

Further, at the time at which the contrast is highest, driving of the image taking lens 1 is suspended so that an imaging optical system carries out adjustment of the focus toward an in-focus state in so-called a mountain climbing system or by determining a phase difference.

Further, at the same time, the image taking control unit 14 determines the brightness of the subject on the basis of the output of the image taking unit 4.

In Step S103, judgment is made as to which of the single shooting mode and the continuous shooting mode is selected for the image taking mode selection switch 36. If the single shooting mode is selected, the processing proceeds to Step S104. If the continuous shooting mode is selected, the processing proceeds to Step S120 and advances to a processing in the case of the continuous shooting mode.

In the case of the single shooting mode, first, in Step S104, judgment is made as to whether the photographer sets the image stabilizer operating portion 35 to be ON or not. If the photographer sets the image stabilizer operating portion 35 to be ON, the processing proceeds to Step S105, and on the other hand, if the photographer sets the image stabilizer operating portion 35 to be OFF, the processing proceeds to Step S121.

If the image stabilizer operating portion 35 is ON, in Step S105, the number of images to be taken and the exposure time of each of the images are calculated on the basis of image taking conditions such as the brightness of the subject that is calculated in Step S102.

Note that the image taking conditions as mentioned here refers to four points, namely, the brightness of the subject, the focal length of the imaging optical system, a f-stop number of the imaging optical system, and a sensitivity of the imaging element.

Suppose, for example, the sensitivity of the image taking unit 4 is set to be ISO 200.

In this case, suppose it is necessary to set the aperture 2 to be f 2.8 and the exposure time to be $1/15$ second, in order to perform proper exposure on the basis of the result of photometry of the brightness of the subject.

Here, when the focal length of the imaging optical system is 60 mm in terms of a 35 mm film, in the case of the image taking where the exposure time is $1/15$ second, image blur is likely to occur due to hand shake.

In this case, the exposure time is set to be $1/60$ second so that the hand shake does not occur, and four split-exposure image taking operations are carried out.

Meanwhile, if a photographic focal length is 90 mm, the exposure time is set to be $1/90$ second so that there occurs no hand shake and six image taking operations are carried out.

In this way, the exposure time in the case where a plurality of images is taken is determined in accordance with the image taking conditions, and further, the number of images to be taken is set in accordance with the image taking conditions.

In a case where one same subject is photographed in a divided manner in a plurality of images, a taken image of a proper brightness can be obtained if the conditions for exposure for each of the image taking operations are as close as possible to the conditions for exposure in the case of proper exposure.

Thus, if the aperture 2 is stopped down and the brightness of the subject is low or if the sensitivity of the image taking unit 4 is set to be low, when plural image taking operations are carried out, the exposure time of each of the image taking operations is set to be as long a time as possible in order to make the exposure conditions as effective as possible.

Note that, if the exposure time is too long, the affect of image deterioration due to hand shake appears on a surface of the image, therefore, it is necessary to set the image taking conditions to be the conditions as described above.

Further, shortage of the exposure time to remain even in the case of the exposure time is complemented by increasing the number of images to be taken.

If the focal length is long, image deterioration due to hand shake is liable to occur unless the exposure time is further shortened. Accordingly, the exposure time is shortened and the number of the images to be taken is increased in accordance with the amount of shortened exposure time to complement the exposure.

Thus, in the case of taking a plurality of images, the exposure time becomes longer as the brightness of the subject is darker and the brightness in the image taking lens 1 is darker. Also, in this case, the exposure time becomes longer as the sensitivity of the image taking unit 4 is lower, and becomes shorter as the focal length of the image taking lens 1 is longer.

Further, in the case where a plurality of images is taken, the number of the images to be taken becomes greater as the brightness of the subject is darker and the brightness in the image taking lens 1 is darker. Also, the number of the images to be taken in this case becomes greater as the sensitivity of the image taking unit 4 is lower and as the focal length of the image taking lens 1 is longer.

After the calculation like this is completed, a display unit provided in a finder of the camera or a liquid crystal display unit provided on an external finishing part of the camera displays that a split exposure mode is set.

In addition, at the same time, the calculated number of images to be taken is displayed thereon to indicate the same to the photographer.

In Step S106, the processing remains in a standby state until the photographer fully presses the release operation portion 31 (SW2), while repeating Steps S101 through S106.

In Step S107, image taking of a first image is started.

At the same time, the speaker 29 outputs the sound indicating the start of image taking, via the sound production drive unit 30.

The sound may be an electronic sound of "beep", a sound of opening of a shutter of a film camera, or a sound of mirror-up, for example.

Note that the operations carried out by the processing from Step S107 through Step S115, some of which are to be described later, are operations in a combining image taking mode in which image taking operation with a short exposure time is repeated plural times, the images obtained by the plural image taking operations are combined, and an apparent exposure is made proper.

When the image taking of the first image is completed, in Step S108, the taken image is temporarily stored in the image storing unit 15.

Then, in Step S109, the processing remains in the standby state, while repeating Step S107 and Step S108, until image taking of all the images is completed.

When the image taking is completed, the processing proceeds to Step S110. In Step S110, the speaker 29 produces a sound indicating completion of image taking via the sound production drive unit 30.

In the case where a plurality of images are taken, the sound indicating the operation is produced once for each of the start of exposure of a first image taking operation and the completion of exposure of the last image taking operation. Therefore, the photographer has no sense of incongruity in taking plural images.

That is, the number of production of sound is equivalent in both of the case where one exposure and image taking operation is ordinarily carried out and the case where a plurality of images are taken, which causes the photographer to have no sense of incongruity.

In Step S111, the characteristic point C1 is extracted by the shift detection unit 16 from among the possible characteristic points in a peripheral portion of the image, namely, from among the characteristic points of building B1 of FIG. 3A, and then the coordinates of the image are calculated.

In Step S112, the coordinate conversion unit 17 carries out coordinate conversion for each of the images.

Here, the coordinate conversion is not carried out for the image P1, which is the first image. That is, the first image P1 is a reference in carrying out the coordinate conversion.

In Step S113, the processing remains in the standby state while repeating Steps S111 and S112 until the coordinate conversion is completed for all the images except for the first image.

When the coordinate conversion is completed with respect to all the images except for the first image, the processing proceeds to Step S114. In Step S114, the first image P1 is combined with each of the images of the second group of images that are subjected to coordinate conversion.

Here, the combination of images are carried out by averaging the signals of corresponding coordinates of each image, and the random noise in the images are decreased by the averaging.

Then, the gain of the image whose noises are decreased is increased to allow the exposure to be at a proper level.

In Step S115, a region of the combined image in which images are not overlapped due to deviation in the composition of each image is cut off, and the image is complemented by diffusion so that the size of the combined image is of the size of an original frame.

In Step S116, gamma correction and compression processing is carried out to a combined image signal.

In Step S117, the image obtained in Step S116 is displayed on the display unit 20 that is disposed at the back or other portion of the camera.

In Step S118, image data calculated in Step S116 is recorded into the recording unit 21. In Step S119, the processing returns to "START" of FIG. 8.

Note that if the release operation portion 31 is continuously half-pressed (SW1) at the stage of Step S119, the processing further advances to Steps S101, S102, S103, S104, and thereafter.

In addition, if the release operation portion 31 is fully pressed (SW2) at the stage of Step S119, the processing does not return to START and waits in a standby state at Step S119.

If it is judged that the image stabilizer operating portion 35 is OFF in Step S104, the processing proceeds to Step S121.

In Step S121, it is judged whether the image taking conditions are the conditions under which image deterioration occurs due to hand shake unless the image stabilizer is used.

As described above, the image taking conditions include the brightness of the subject, the brightness in the lens, the sensitivity of the imaging element, and the photographing focal length.

In Step S121, the exposure time is calculated on the basis of the brightness of the subject, the brightness in the lens, and the sensitivity of the imaging element, and it is judged whether image deterioration due to hand shake is likely to occur with the present photographing focal length and the calculated exposure time.

Then, if the image deterioration is likely to occur, the processing proceeds to Step S122. If the image deterioration is not likely to occur, the processing proceeds to Step S123.

In Step S122, the display unit disposed within the finder of the camera or on the display unit 20 that is disposed on the external finishing of the camera displays recommendation of setting the image stabilizing mode to be ON.

In Step S123, the processing repeats Steps S101 through S123 until the release operation portion 31 is fully pressed (SW2), while remaining in a standby state.

In Step S124, the processing is in a standby state until an ordinary image taking mode that implements effective exposure conditions with one exposure operation is completed, and when the exposure is completed, the processing proceeds to Step S116.

Note that although not explained here, even in the case of ordinary image taking, the sound of image taking operation is produced from the speaker 29 in accordance with the operations from the start of image taking and the completion thereof.

That is, in the combining image taking mode in which a plurality of images are combined and also in the ordinary image taking mode, the sound of image taking operation in the same type is produced.

In this case, in terms of the sound of the image taking operation, the photographer can recognize whether the exposure is effected for a long time period, by the difference in the length of the operational sound come out of the speaker 29 during the time period from the start sound of image taking and the completion sound of image taking. That is, in this case, the photographer cannot recognize whether a plurality of images is taken or not.

In Step S116, gamma correction and compression processing are carried out to the combined image signal. In Step S117, the image obtained in Step S116 is displayed on the display unit 20.

In Step S118, the image data obtained in Step S116 is recorded into the recording unit 21. In Step S119, the processing returns to "START" of FIG. 8.

As is known from the flow chart of FIG. 8, even in the case where the image stabilizer operating portion 35 is OFF, under the image taking conditions under which image deterioration due to hand shake occurs, occurrence of image deterioration is prevented in advance by displaying the message urging the photographer to utilize the image stabilizer to advance to the combining image taking mode.

Further, in the combining image taking mode also, it is possible to carry out a preferable image taking with any focal length by altering each exposure time in accordance with the focal length.

Next, if the continuous shooting mode is selected by the image taking mode selection switch 36 in Step S103, the processing advances to a continuous shooting mode processing routine in Step S120.

Figure 9:
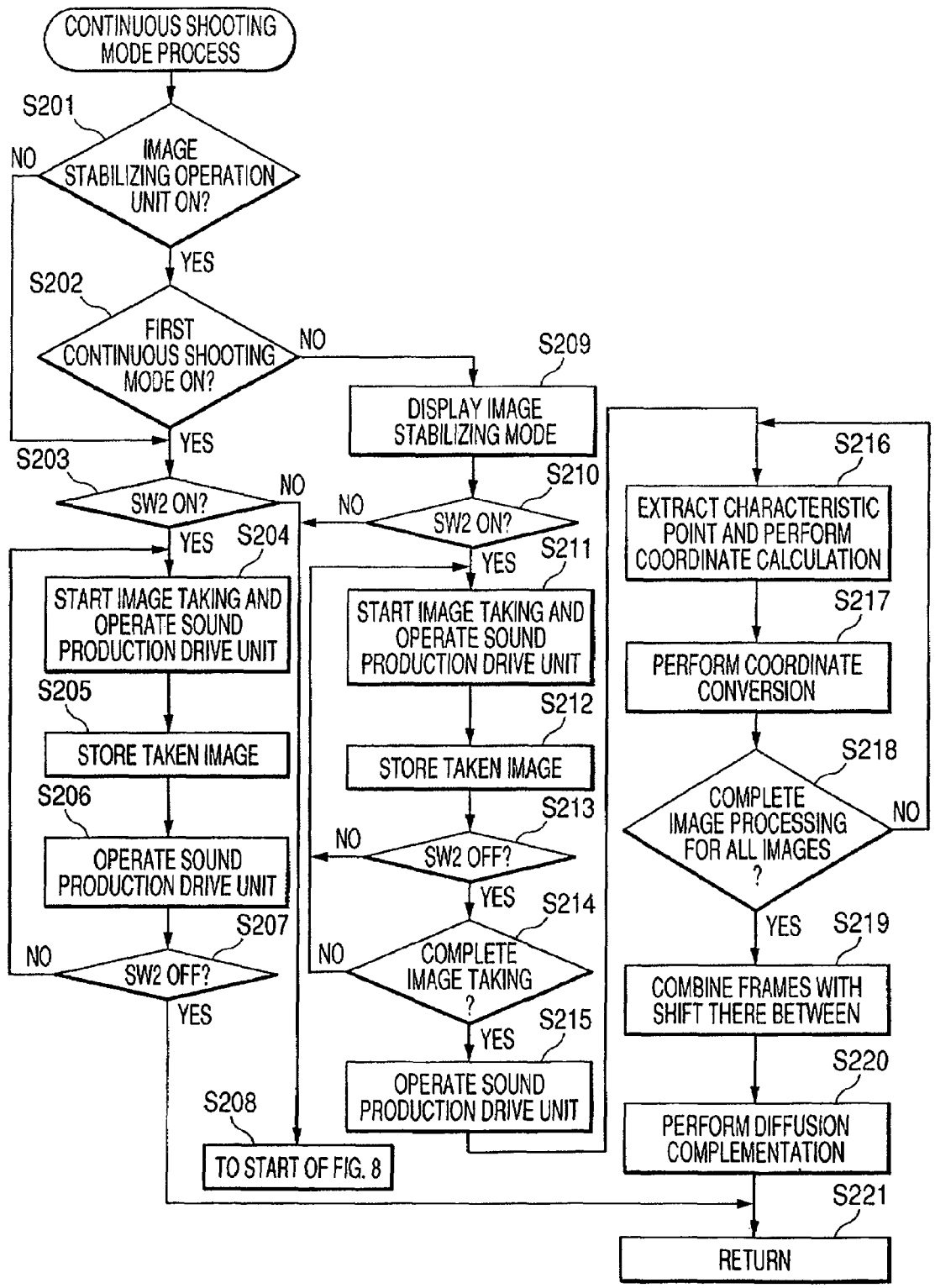
FIG. 9 is a flow chart of a processing operation at the time of continuous shooting mode.

FIG. 9 shows a flow chart of a processing at the time of continuous shooting mode in Step S120 of FIG. 8.

In the continuous shooting mode processing, first, it is judged whether the image stabilizer operating portion 35 is ON or OFF in Step S201. If it is judged that the image stabilizer operating portion 35 is ON, the processing proceeds to Step S202. If it is judged that the image stabilizer operating portion 35 is OFF, the processing proceeds to Step S203.

In Step S202, the number of split exposure time is calculated in accordance with the image taking conditions, and it is judged whether the image taking mode is the first continuous shooting mode or the second continuous shooting mode on the basis of the result of the calculation.

If it is judged that the image taking mode is the first continuous shooting mode, the processing proceeds to Step S203. If it is judged that the image taking mode is the second continuous shooting mode, the processing proceeds to Step S209.

Here, for example, if the focal length is 300 mm in terms of the 35 mm film and the necessary exposure time is 1/10 second, the number of images to be split-exposed is 30.

In this regard, as described above, as the number of the images to be split-exposed increases, the image taking time becomes longer by an amount corresponding to the level calculated by multiplying the time for transfer of the charge from the image taking unit 4 by the number of images to be split-exposed.

Further, in this case, the image taking mode is in the continuous shooting mode, the image taking operations for the thirty images are repeated in a plurality of times. Aa result, the image taking time becomes significantly long.

In this regard, if the number of images to be split-exposed is greater than ten, the image stabilization is forced to be OFF.

This is the operation in the case of the first continuous shooting mode. In the processing in this case, the photographer sets the image stabilization to be OFF by the image stabilizer operating portion 35, and the same operations as in the case where the single shooting mode is selected by the image taking mode selection switch 36 are carried out.

On the other hand, if the number of images to be split-exposed is ten or smaller, the image taking is carried out with using the frame shifting combination as described above in the second continuous shooting mode.

Here, the criterion of judgment between the first continuous shooting mode and the second continuous shooting mode is made whether the number of split-exposed images is in excess of ten or not. However, optimum value of the image taking condition differs depending on the characteristics of the camera such as the time for transfer of charge from the imaging element. Therefore, it is preferable to set a proper value depending on the characteristics of the camera.

Further, although not shown in FIG. 9, if the image stabilizer operating portion 35 is OFF in Step S201 and it is preferable to carry out the image taking in the second continuous shooting mode, that is, if the image stabilization is necessary, the message indicating that it is necessary to operate the image stabilizer is displayed, just as in the case where the image stabilizer operating portion 35 is OFF in the single shooting mode.

In Step S203, the processing repeats Steps S101 through S203 until the release operation portion 31 is fully pressed (SW2), while remaining in the standby state.

If the release operation portion 31 is fully pressed (SW2), the image taking is started in Step S204. At the same time, the speaker 29 produces the image taking operation sound.

When the image taking of the first image is completed, the processing proceeds to Step S205. In Step S205, the taken image is stored. Then, the image taking completion sound is produced in Step S206. Then, the processing proceeds to Step S207 to judge whether the full-pressing (SW2) is ended or not.

If it is judged that the full-pressing (SW2) is not ended, the processing returns to Step S204 to start the image taking of the second image. The processing repeats Steps S204 through S207 until full-pressing (SW2) of the release operation portion 31 by the photographer is ended.

If it is judged that the full-pressing (SW2) is ended, the image taking is ended, and then the processing returns from Step S221 to the original processing, and then proceeds to Step S116 of FIG. 8.

If it is judged that the image taking mode is in the second continuous shooting mode in Step S202, the processing proceeds to Step S209 to display the image stabilizing mode.

In Step S210, the processing repeats Steps S101 through S210 until the release operation portion 31 is fully pressed (SW2), while remaining in the standby state.

If the release operation portion 31 is fully pressed (SW2), the processing proceeds to Step S211. In Step S211, the image taking of the first split-exposed image is started, and at the same time, the speaker 29 produces the sound indicating the start of image taking operation.

When the image taking of the first image ends, the taken image is stored in Step S212. Then the processing proceeds to Step S213 to judge whether the full-pressing (SW2) is ended.

If it is judged that the full-pressing (SW2) is not ended, the processing returns to Step S211 to start the image taking of the second image. In this case, the processing repeats Steps S211 through S213 until the full-pressing (SW2) is ended.

If it is judged that the full-pressing (SW2) is ended, the processing proceeds to Step S214. In Step S214, judgment is made as to whether the split-exposure is ended in the number of times necessary for image taking.

For example, in the part (f) of FIG. 6, even if the full-pressing (SW2) is ended during a time period from a time t35 to a time t36, the processing does not judge that the image taking is completed until the image taking of the images to be split-exposed which are necessary for combining the images for the third image is completed.

In other words, at the time the full-pressing (SW2) is ended and when the image taking of the last frame of the combined image in which the images to be split-exposed being currently taken is ended, it is judged that the image taking is ended.

The processing repeats Steps S211 through S214 until the image taking is completed. When the image taking is completed, the processing proceeds to Step S215. In Step S215, the speaker 29 produces a sound indicating the completion of the image taking.

In Step S216, the shift detection unit 16 extracts characteristic points from peripheral regions of an image. Then, the shift detection unit 16 calculates the coordinates of the image. In Step S217, the coordinate conversion unit 17 carries out the coordinate conversion for each image.

Here, only the coordinate conversion for the first image is not carried out. That is, the first image P1 is set to be the reference of the coordinate conversion.

In Step S218, the processing repeats Steps S216 and S217 until the coordinate conversion is completed for all the images except for the first image, and then remains in the standby state.

When the coordinate conversion for all the images except for the first image is completed, the processing proceeds to Step S219.

In Step S219, as shown in the part (f) of FIG. 6, the combination processing is carried out by shifting the images by the predetermined given number of frames. Thus, a plurality of images is produced in accordance with the time period corresponding to the time period during which the photographer fully presses (SW2) the release operation portion 31.

In Step S220, a region of the combined image which is not overlapped due to deviation in the composition of each image is cut off, and the image is subjected to a diffusion complementation so that the size of the combined image is of the size of an original frame.

In Step S221, the processing returns to the original routine, and the processing after Step S116 of FIG. 8 is carried out.

The second continuous shooting mode is intended to obtain a plurality of combined images.

For example, in the case of obtaining three combined images as shown in the part (f) of FIG. 6, in order not to cause the photographer to feel disorder, it is preferable that the production of sounds produced at the time of start and completion of image taking be carried out in three sets.

However, the frames to be combined are overlapped in terms of time as shown in the part (f) of FIG. 6. Accordingly, if the sound indicating the start of image taking is produced at a first frame (t31, t32, and t33) to be used for combination and the sound indicating the completion of image taking is produced at a last frame (t33, t34, and t36), the photographer feels disorder.

Figure 10:
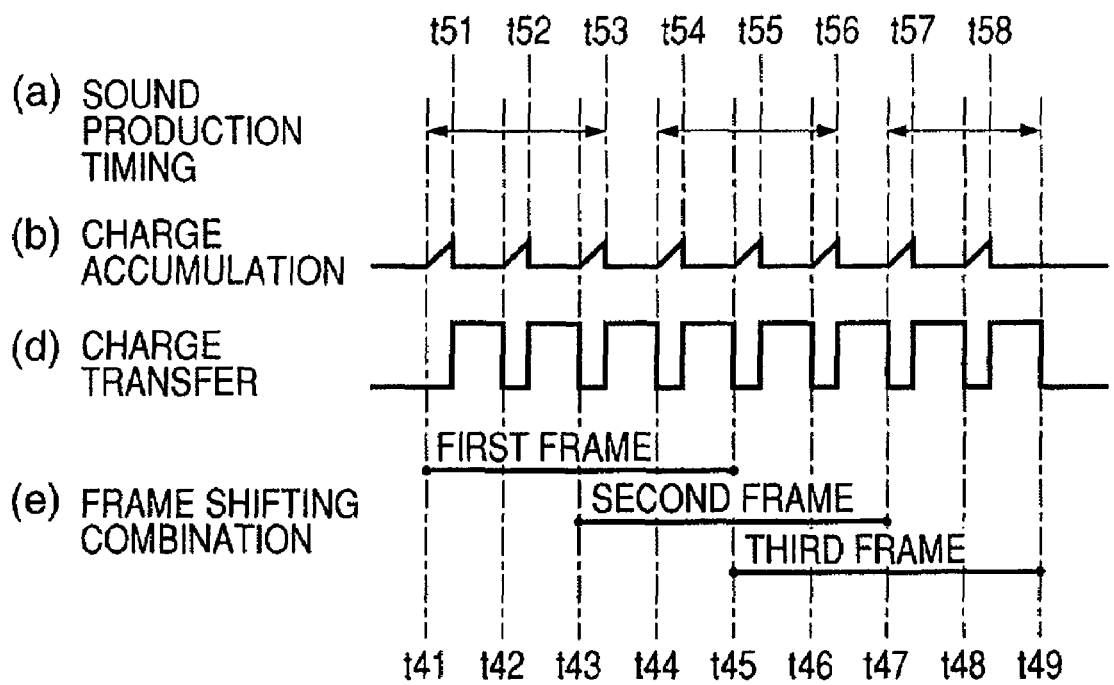
FIG. 10 is a timing chart of sound production at the time of continuous shooting mode.

FIG. 10 is a timing chart showing the sound producing operation in sound production timings under the same conditions as in the case shown in the part (f) of FIG. 6.

As shown in the part (d) of FIG. 10, the split-exposure of a fist image is started at a time t41, and the image taking is completed at a time t49. Therefore, it is necessary to produce the sound for the start of image taking at the time t41, and to produce the sound for the completion of image taking at the time t49, as shown in the part (a) of FIG. 10.

In the second continuous shooting mode, the image taking is completed when the full-pressing (SW2) is ended and the image taking of the last frame of the combined image including the image to be split-exposed being currently taken is completed.

For example, if the full-pressing (SW2) is ended during the time period from a time t43 to a time t44, the image taking is continued until a time t47 at which the split-exposure necessary for producing a second combined image is completed.

If the full-pressing (SW2) is ended before the time t43, the image taking is completed with producing one combined image, namely, at the time t45.

In the same way, if the full-pressing (SW2) is ended during the time period from the time t43 to the time t45, the image taking is completed with producing two combined images. If the full-pressing (SW2) is ended during the time period from the time t45 to the time t47, the image taking is completed with producing three combined images.

FIG. 10 assumes a case where the full-pressing (SW2) is performed during the time period from the time t45 to the time t47.

As shown in the part (a) of FIG. 10, the sound for start of the image taking for a first time is produced at the time t41, and the sound for the completion of the image taking is produced at a time t53. For a second image taking, the sound for the start of the image taking is produced at the time t44, and the sound for the completion of the image taking is produced at a time t56. For a third image taking, the sound for the start of the image taking is produced at the time t47, and the sound for the completion of the image taking is produced at the time t49.

In this way, by producing the sounds for the start and the completion of the image taking in three sets in total in a substantially uniform manner during the image taking time (the time period from the time t41 through the time t49), the photographer can recognize that three combined images are being taken.

Therefore, the photographer is not confused or does not feel disorder during the image taking operation.

Further, if the full-pressing (SW2) is ended before the time t43, the sound for the completion of image taking may be produced not at the time t53 but at the time t44, to thereby complete the image taking. Also, if the full-pressing (SW2) is ended during the time period from the time t43 to the time t45, the sound may be produced not at the time t56 but at the time t47.

As many apparently widely different embodiments of the present invention can be made without departing from the sprit and scope thereof, it is to be understood that the invention is not limited to the specific embodiment thereof except as defined in the appended claims.

This application claims priority from Japanese Patent Application No. 2004-363411 filed Dec. 15, 2004, which is hereby incorporated by reference herein.

What is claimed is:

1. An image taking apparatus including an image pick-up device for obtaining an image signal of a subject to be taken, comprising:

a release operation portion for instructing the image pick-up device to start an image pick-up operation;

an image taking mode selection switch for changing an image taking mode between a single shooting mode in which one still image is taken by operating the release operation portion and a continuous shooting mode in which a plurality of still images in time series are sequentially taken by operating the release operation portion;

image taking condition determining means for determining an image taking condition of the image taking apparatus, including an exposure time in accordance with a condition of the subject to be image taken;

split exposure means for executing the plurality of split exposure operations each of which split exposure time is shorter than the exposure time determined by the image taking condition determining means, so as to obtain a plurality of split-exposed images;

image combining means for combining the plurality of split-exposed images obtained by the image pick-up device to form one of the still image or the plurality of the still images; and control means for controlling the image pick-up device, the split exposure means, and the image combining means in accordance with states of the release operation portion, the image taking mode selection switch, and the image taking condition determining means, wherein the control means causes the image combining means in a case that the image taking mode selection switch selects the continuous shooting mode, to combine the plurality of the split exposed images and provide the plurality of still images in time series which are sequentially obtained, and the control means controls the image combining means so that at least two images of the plurality of still images in time series formed by the image combining means includes a common split-exposed image.

2. An image taking apparatus according to claim 1, wherein each image is subjected to combination with the plurality of split-exposed images that is subjected to coordinate conversion on a basis of a position of a characteristic point.

3. An image taking apparatus according to claim 1, wherein the control means determines one of a number of times of split-exposure and time of splitting of the split-exposed images under at least one image pick-up condition among brightness of a subject, a focal length of an image taking optical system, an f-stop number of the image taking optical system, and sensitivity of an image pick-up element.

* * * * *